(12) United States Patent
Hamma et al.

(10) Patent No.: US 6,651,507 B1
(45) Date of Patent: *Nov. 25, 2003

(54) PRESSURE GAUGE HAVING A DAMPENER MECHANISM

(75) Inventors: John C. Hamma, Isle of Palms, SC (US); Walter J. Ferguson, Waterbury, CT (US); Jeffrey T. Blake, Milford, CT (US); Michael J. Maloney, Cicero, NY (US); Louis A. Rosen, Trumbull, CT (US)

(73) Assignee: Dresser, Inc., Addison, TX (US)

( * ) Notice: Subject to any disclaimer, the term of this patent is extended or adjusted under 35 U.S.C. 154(b) by 99 days.

This patent is subject to a terminal disclaimer.

(21) Appl. No.: 09/589,377

(22) Filed: Jun. 7, 2000

Related U.S. Application Data

(63) Continuation-in-part of application No. 09/080,071, filed on May 15, 1998, now Pat. No. 6,119,525.

(51) Int. Cl.[7] .................................................. G01L 7/04
(52) U.S. Cl. ............................................ 73/741; 73/739
(58) Field of Search ...................... 73/741, 739, 707, 73/732; 164/154.8, 155.3

(56) References Cited

U.S. PATENT DOCUMENTS

| | | |
|---|---|---|
| 13,468 A | 8/1855 | Mathews, Jr. |
| 18,129 A | 9/1857 | Ashcroft |
| 974,081 A | 10/1910 | Kronenberg |
| 1,288,886 A | 12/1918 | Helm |
| 1,345,630 A | 7/1920 | Place |
| 1,416,814 A | 5/1922 | Glickerman |
| 1,421,501 A | 7/1922 | Kraft et al. |
| 1,444,099 A | 2/1923 | Berry |
| 1,536,478 A | 5/1925 | Crocker |
| 1,537,338 A | 5/1925 | Deverall |
| 1,664,776 A | * 4/1928 | Heise .......................... 73/739 |
| 1,874,765 A | * 8/1932 | Lammeree .................... 73/739 |
| 2,116,628 A | 5/1938 | Heise .......................... 73/109 |

(List continued on next page.)

FOREIGN PATENT DOCUMENTS

| | | |
|---|---|---|
| CA | 974081 | 9/1975 |
| DE | 2 249 266 | 4/1974 |
| GB | 534662 | 3/1941 |
| GB | 566948 | 1/1945 |
| JP | 58-160314 | 10/1983 |
| JP | 60-31643 | 3/1985 |
| JP | 3-109172 | 11/1991 |
| JP | 51-88239 | 7/1993 |
| WO | WO 99/02954 | 1/1999 |
| WO | WO 99/02955 | 1/1999 |

OTHER PUBLICATIONS

Bulletin 60; "*The Astragauge*"; Astra Products; pp. 6.
Search Report dated Jul. 17, 2002 for International Application No. PCT/US02/08948.
Brochure: "Fearless Under Pressure," Palmer instruments Inc., pp. 1, Internet www/instrumentationgroup.com.
Ashcroft Palmer–Wahl; Fearless pressure gauge advertisement; ISA Show, New Orleans; at least as early as Aug. 2000.

Primary Examiner—Edward Lefkowitz
Assistant Examiner—C. D. Dickens
(74) Attorney, Agent, or Firm—Fish & Richardson P.C.

(57) ABSTRACT

Various embodiments are disclosed of dampening apparatus for a pressure gauge in which a short length of sleeve, ferrule, hub or thimble encircles a pointer shaft in a close but loose fit relation defining a clearances packed with a high viscosity dampening agent such that it serves to decelerate and cushion any sudden shock or pulsation force that would otherwise be transmitted from the pointer shaft to a pointer registering values of pressure of fluid pressure being monitored.

19 Claims, 7 Drawing Sheets

U.S. PATENT DOCUMENTS

| | | | |
|---|---|---|---|
| 2,181,730 A | 11/1939 | Heise | 285/166 |
| 2,378,201 A | 6/1945 | Dewan | 73/414 |
| 2,565,526 A | 8/1951 | Seitz | 73/388 |
| 2,693,896 A | 11/1954 | Brown | 220/44 |
| 2,701,968 A * | 2/1955 | Brown | 73/739 |
| 2,712,240 A | 7/1955 | Booth | 73/418 |
| 2,796,765 A * | 6/1957 | Huston | 73/739 |
| 3,175,531 A | 3/1965 | Du Bois | 116/129 |
| 3,214,979 A | 11/1965 | Bissell et al. | 73/418 |
| 3,277,722 A | 10/1966 | Huston | 73/418 |
| 3,335,609 A * | 8/1967 | Nelson | 73/739 |
| 3,398,584 A | 8/1968 | Heise | 73/418 |
| 3,549,043 A | 12/1970 | Waite | 220/82 |
| 3,555,909 A | 1/1971 | Harrah | 73/411 |
| 3,596,509 A | 8/1971 | Raffaelli | 73/146.3 |
| 3,603,151 A | 9/1971 | Zurstadt | 73/368.6 |
| 3,630,089 A | 12/1971 | Bissell | 73/431 |
| 3,633,535 A | 1/1972 | Puster | 116/129 |
| 3,633,538 A * | 1/1972 | Puster | 116/129 R |
| 3,641,820 A | 2/1972 | Bissell | 73/418 |
| 3,661,027 A | 5/1972 | Gattesco | 74/411 |
| 3,765,249 A | 10/1973 | Bissell | 73/431 |
| 3,765,448 A | 10/1973 | Dussia | 137/553 |
| 3,803,918 A | 4/1974 | Blough, Jr. | 73/420 |
| 3,807,232 A | 4/1974 | Wetterhorn | 73/418 |
| 3,922,919 A | 12/1975 | Schulze et al. | 73/418 |
| 3,975,967 A | 8/1976 | Conti | 73/411 |
| 4,051,730 A | 10/1977 | Andrews et al. | 73/416 |
| 4,055,085 A | 10/1977 | Wetterhorn | 73/418 |
| 4,100,812 A * | 7/1978 | Gray et al. | 73/732 |
| 4,109,537 A | 8/1978 | Gorgens et al. | 73/756 |
| 4,148,123 A | 4/1979 | Neubeck et al. | 29/407 |
| 4,161,888 A | 7/1979 | Bissell | 73/740 |
| 4,168,631 A | 9/1979 | Wetterhorn et al. | 73/741 |
| 4,237,738 A | 12/1980 | Wetterhorn | 73/740 |
| 4,240,298 A | 12/1980 | Wetterhorn | 73/732 |
| 4,246,796 A | 1/1981 | Wetterhorn | 73/732 |
| 4,299,253 A * | 11/1981 | Burton | 73/707 X |
| 4,337,664 A | 7/1982 | Kipp et al. | 73/741 |
| 4,361,046 A | 11/1982 | Wetterhorn et al. | 73/711 |
| 4,413,523 A * | 11/1983 | Claxton et al. | 73/707 |
| 4,413,524 A * | 11/1983 | Kosh | 73/707 |
| 4,444,057 A | 4/1984 | Wetterhorn | 73/739 |
| 4,485,676 A | 12/1984 | Wilson | 73/741 |
| 4,488,341 A | 12/1984 | Scott et al. | 29/156.4 |
| 4,501,152 A | 2/1985 | Wetterhorn et al. | 73/738 |
| 4,502,334 A | 3/1985 | Gorgens et al. | 73/705 |
| 4,528,755 A | 7/1985 | Kanda et al. | 33/172 |
| 4,542,654 A | 9/1985 | Wilson et al. | 73/741 |
| 4,545,256 A | 10/1985 | Ferguson | 73/738 |
| 4,552,389 A | 11/1985 | Babuder et al. | 285/379 |
| 4,753,112 A | 6/1988 | Wetterhorn et al. | 73/431 |
| 4,939,338 A | 7/1990 | Bregy et al. | 219/137 |
| 5,000,049 A | 3/1991 | Cooper et al. | 73/730 |
| 5,067,100 A | 11/1991 | Bissell et al. | 364/571.01 |
| 5,095,266 A | 3/1992 | Ohike et al. | 324/146 |
| 5,181,422 A | 1/1993 | Leonard et al. | 73/715 |
| 5,345,400 A | 9/1994 | Bissell et al. | 364/571.01 |
| 5,416,475 A | 5/1995 | Tolbert et al. | 340/870.02 |
| 5,437,066 A | 8/1995 | Mills et al. | 4/661 |
| 5,481,921 A | 1/1996 | Carpenter et al. | 73/743 |
| 5,567,883 A | 10/1996 | Nara | 73/741 |
| 5,591,918 A | 1/1997 | Ferguson | 73/732 |
| 5,597,276 A | 1/1997 | Yokell | 409/132 |
| 5,644,074 A * | 7/1997 | Huang | 73/146.8 |
| 5,650,566 A | 7/1997 | Chou | 73/431 |
| 5,913,447 A | 6/1999 | Carpenter | 220/664 |
| 5,952,579 A | 9/1999 | DeFrancesco et al. | 73/743 |
| 5,970,796 A | 10/1999 | Blake et al. | 73/715 |
| 6,085,595 A | 7/2000 | Ferguson | 73/730 |
| 6,119,525 A * | 9/2000 | Hamma | 73/739 |
| 6,164,138 A | 12/2000 | Blake et al. | 73/732 |
| 6,295,876 B1 | 10/2001 | Busch | 73/740 |

* cited by examiner

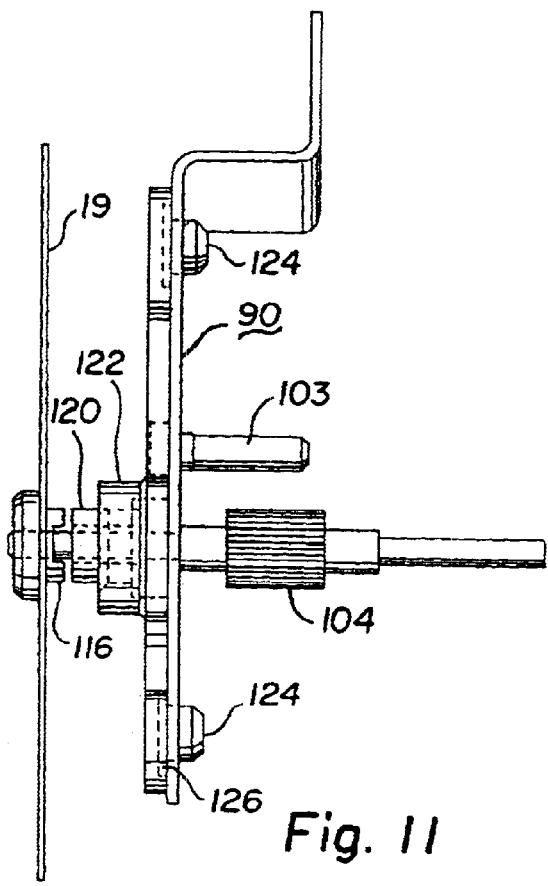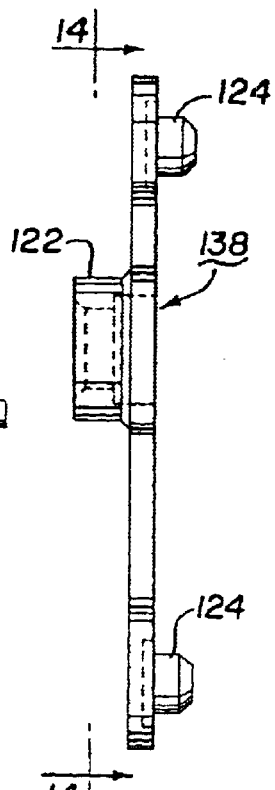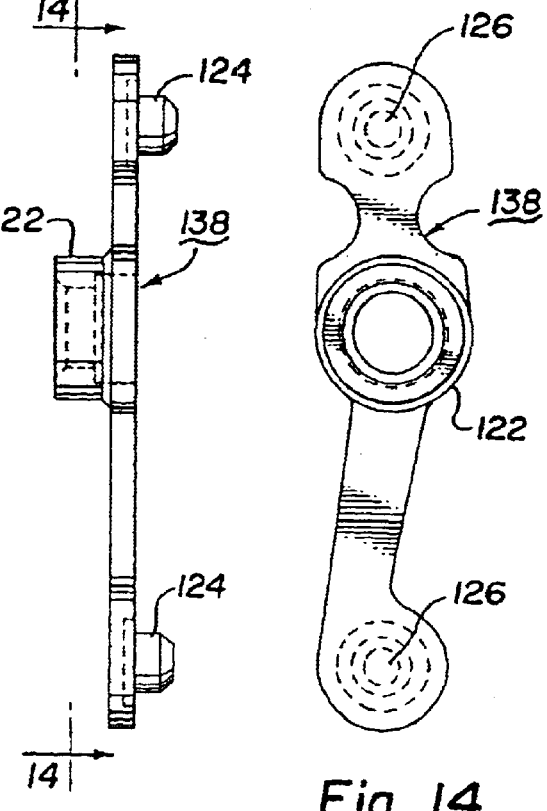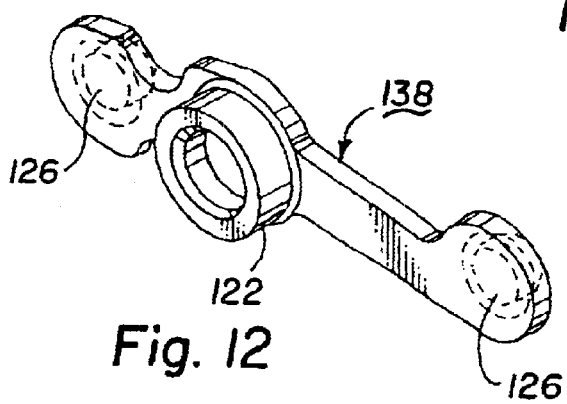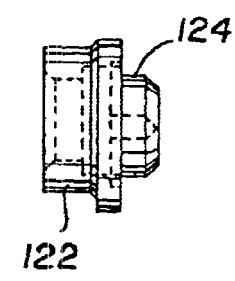
Fig. 11
Fig. 13
Fig. 14
Fig. 12
Fig. 15

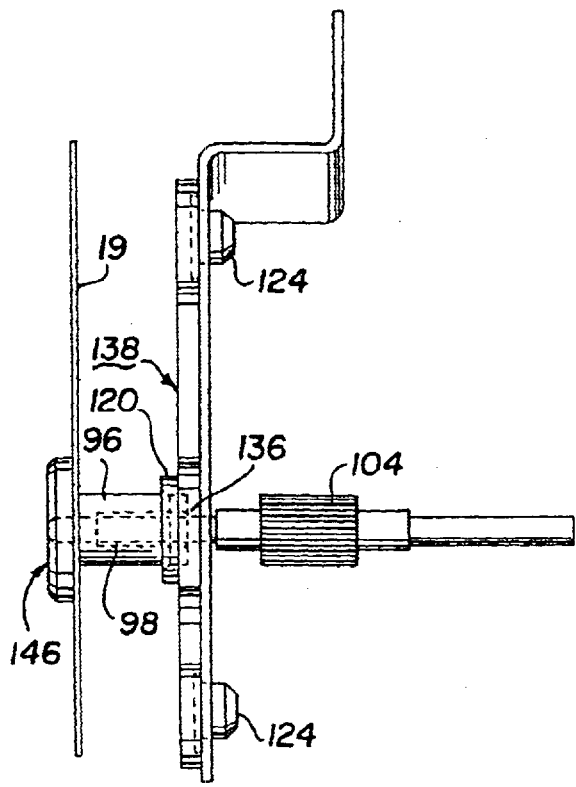
Fig. 18
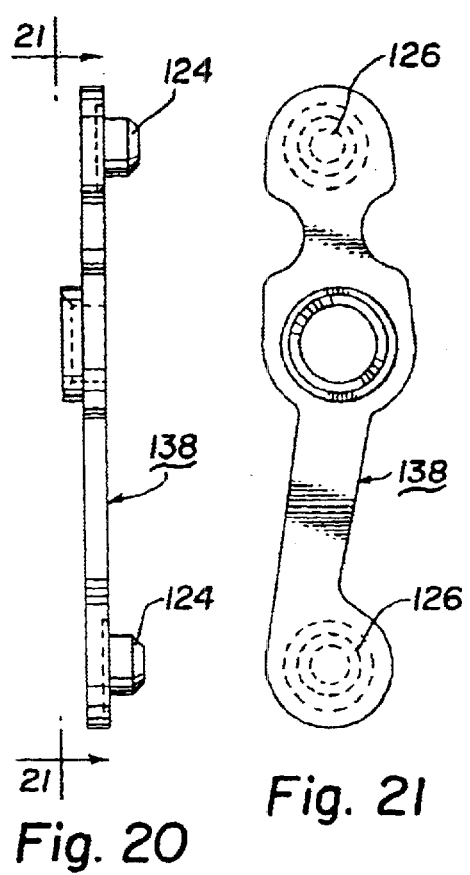
Fig. 20
Fig. 21
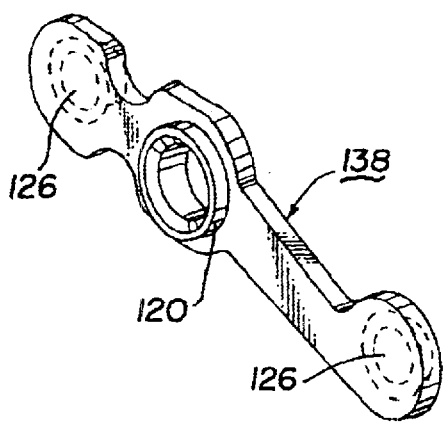
Fig. 19
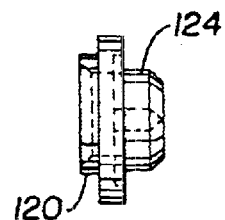
Fig. 22

PRESSURE GAUGE HAVING A DAMPENER MECHANISM

This Application is a continuation-in-part of application Ser. No. 09/080,071 filed May 15, 1998 now U.S. Pat. No. 6,119,525.

FIELD OF THE INVENTION

The field of art to which the invention pertains comprises pressure gauges having a dampener operative to avoid transmitting shock pulsation or vibration forces from the condition sensitive element to the output indicia.

1. Background of the Invention

Pressure gauges are widely utilized in a myriad of different environments for commercial and industrial applications where measuring and indication of fluid pressure values is required. Values of pressure are usually displayed by a pointer in analog form. The primary sensing element of the gauge typically comprises a Bourdon tube having a free end that incurs a predictable displacement in response to pressure changes to which it is exposed. Typically, tube displacement is translated via a movement or amplifier to a rotatable pointer that is displaced opposite a dial of calibrated pressure values.

The gauge movement impresses the extent of tube deflection upon the indicator element which registers the value of force, pressure or condition. For accurate measurement, the responsive element must not only be sensitive to very small changes in value of the forces of pressures measured, but the deflection of the condition responsive element in response to such changes must be sufficiently minute that the indicator will legibly register a precise change in value. Accordingly, when the force or pressure to be measured is subject to rapid or violent pulsations, it can cause the gauge movement and indicator to vibrate or fluctuate. Under these conditions it is very difficult to measure accurately the average mean or peak value of the source as a result of the pulsations being impressed on the condition responsive element. Such vibration makes reading of the gauge difficult and may even cause misalignment of parts, thereby necessitating frequent readjustment. Moreover, it tends to result in excessive strain and wear on the gauge elements, thereby reducing the expectant life of the gauge.

2. Background of the Prior Art

The use of dampeners in gauges are well known as exemplified by the disclosures of U.S. Pat. Nos. 1,664,776; 1,874,765; 2,701,968; 2,796,765 3,335,609; 4,100,812 and 4,413,523. Thus, while various constructions of gauge dampeners are known, they tend to be of relatively complex construction and therefore relatively costly. Another approach has been to liquid fill the case, but this has proven to be expensive, heavy and troublesome with associated leakage and disposal problems.

Despite recognition of the foregoing, a much simpler and more economically feasible construction of gauge dampener has heretofore been unknown.

OBJECTS OF THE INVENTION

It is an object of the invention to provide a novel dampener construction for gauges to dampen undesirable vibration fluctuation forces internally imposed on the gauge.

It is a further object of the invention to effect the previous object with a construction that is economically advantageous compared with previous constructions utilized for that purpose.

It is a still further object of the invention to effect the previous objects with a dampener that functions in a highly efficient manner and yet is substantially maintenance free.

SUMMARY OF THE INVENTION

This invention relates to pressure gauge apparatus including novel dampener apparatus for eliminating the adverse effects of pulsation, and vibration forces, and the like received by the gauge. More specifically, the invention relates to such a dampener in a pressure gauge that is operative to absorb shock pulsation or vibration forces against being transmitted from the output of the condition responsive element to the output indicia of the gauge, commonly in the form of a pointer opposite a dial plate.

The foregoing is achieved in accordance herewith by means of a close fitting, dampener agent packed sleeve, ferrule, thimble, hub, cup, etc. of metal or plastic situated on the pointer shaft of the gauge. In a first embodiment, a T-shaped hub including an elongated shank is integrally secured to an end disc. The shank includes a central elongated bore in which to receive an extended end portion of the pointer shaft to be dampened and is sized to afford a loose but controlled clearance fit thereabout. Concomitantly, the disc is positioned against the interior face of the gauge housing in a dampener cushioning relation with a layer of dampener agent therebetween to be described.

In a second embodiment, a floating dampener agent cup or the like, preferably in the form of a ferrule of metal or plastic, is situated at an intermediate location on the pointer shaft. To achieve the desired dampening effect the floating ferrule encircles the shaft so as to afford a controlled clearance about the shaft and is similarly packed with a dampener agent of selected viscosity.

In a third embodiment, the dampener is formed of a hub of metal or plastic surrounding the pointer shaft between the pinion gear and the back face of the dial plate. A quantity of dampener agent, as before, is placed between the hub and the juxtaposed surfaces thereabout. Unlike the previous embodiments, this embodiment does not require any modification to the basic gauge construction.

The shaft receiving bore of each embodiment affords a controlled clearance relative to the received support shaft of between about 0.002 inches–0.030 inches with about 0.008 inches being optimum. The dampener agent pack is characterized preferably by a viscosity range of an oil from about 1 million centistokes to a grease consistency number of 144 per ASTM D 1403 (¼ scale cone penetration test). Optimum consistency is about number 190.

Still further embodiments are disclosed in which various structures such as a sleeve, hub, bushing, recess or the like surround the pointer shaft and define a clearance containing a reservoir of lubricant.

Any surrounding structures afford outside clearance of between about 0.009 inches–0.051 inches with an optimum of about 0.017 inches that is similarly packed with a dampener agent. be obtained without the complexity normally associated with dampener constructions of the prior art.

The above noted features and advantages of the invention as well as other superior aspects thereof will be further appreciated by those skilled in the art upon reading the detailed description that follows in conjunction with the drawings.

BRIEF DESCRIPTION OF THE DRAWINGS

FIG. 11 is a fragmentary side elevation showing the dampener of the sixth embodiment hereof;

FIG. 12 is an isometric view of the retainer part of FIG. 11;

FIG. 13 is a top plan view of the retainer of FIG. 12;

FIG. 14 is a side elevation of the retainer as seen substantially along the lines 14—14 of FIG. 13;

FIG. 15 is a plan view of an individual lug of FIG. 13;

FIG. 18 is a fragmentary side elevation showing the dampener of the eighth embodiment hereof;

FIG. 19 is an isometric view of the retainer part of FIG. 18;

FIG. 20 is a top plan view of the retainer of FIG. 19;

FIG. 21 is a side elevation of the retainer as seen substantially along the lines 21—21 of FIG. 20;

FIG. 22 is a plan view of an individual lug of FIG. 20;

DESCRIPTION OF THE PREFERRED EMBODIMENTS

Figure 1:
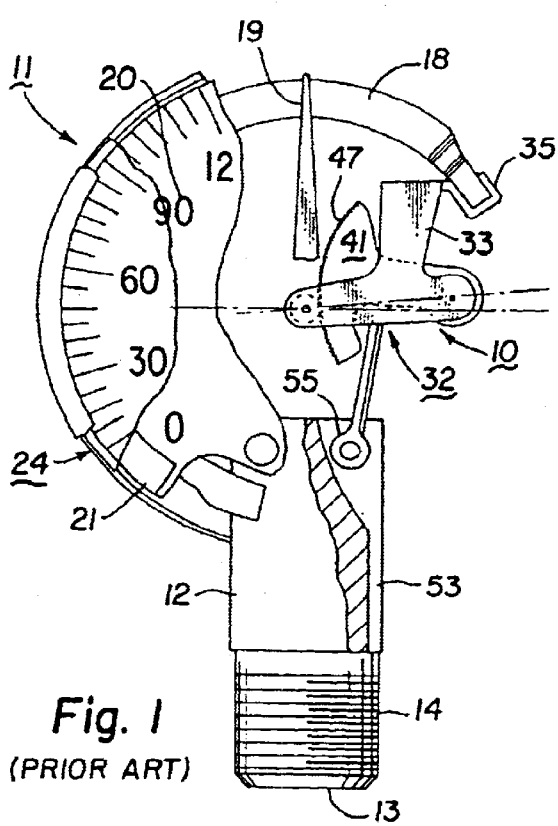
FIG. 1 is a front elevation of a pressure gauge of the prior art.

In the description which follows, like parts are marked throughout the specification and drawings with the same reference numerals respectively. The drawing figures are not necessarily to scale and in certain views, parts may have been exaggerated for purposes of clarity.

Referring now to the drawings, there is illustrated in FIG. 1 a pressure gauge designated 11 that may for example, be of a type disclosed in U.S. Pat. No. 4,055,085 incorporated herein by reference. The instrument includes an amplifier 10, a stem or socket 12 in which fluid pressure to be monitored is received at an inlet 13 and includes threads 14 for connecting the gauge to a system with which it is to be employed. Fluid pressure received at inlet 13 is communicated to a Bourdon tube 18 that is subject to arcuate motion displacement in a well known manner in response to incremental pressure changes received at inlet 13.

The motion of Bourdon tube 18 is conducted to amplifier 10 to produce an amplified and correlated motion for operating a pointer 19 relative to pressure values 20 on dial face 21. Except for stem 12, each of the foregoing components comprise the operating mechanism that is substantially contained within enclosed housing 24. The housing consists of a cup shape shell-like backing 25 secured via screws 26 to stem 12 and bezel 27 telescopically fit onto backing 25 to secure a crystal 28 for viewing the pointer position relative to pressure values 20 on face 21.

Figure 2:
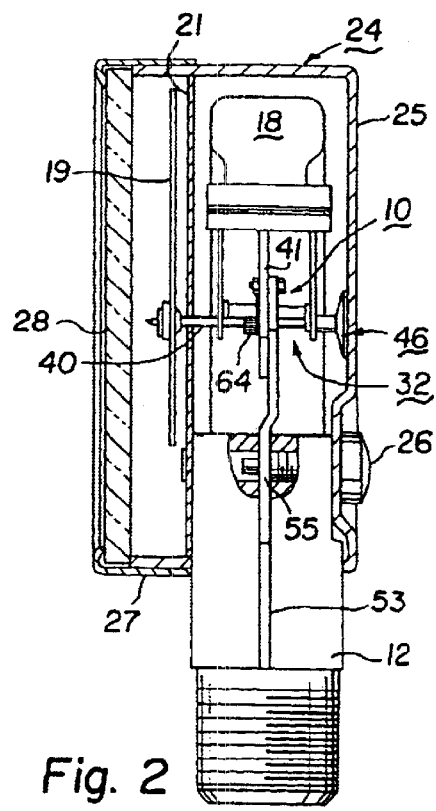
FIG. 2 is a sectional elevation of the gauge of FIG. 1 modified to incorporate the first embodiment dampener in accordance with the invention.
Figure 3:
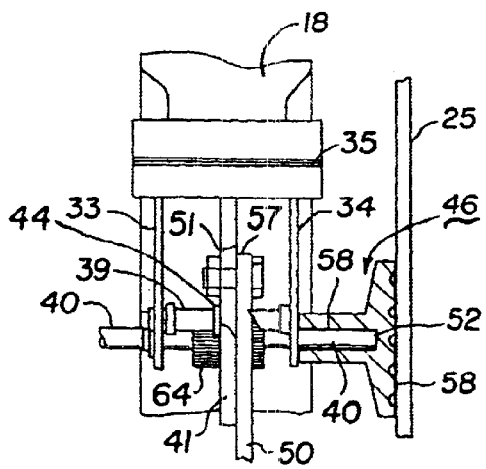
FIG. 3 is an enlarged fragmentary elevation of the dampener installation of FIG. 2.

Amplifier 10, as best seen in FIGS. 2 and 3, includes a centrally upright U-shaped carriage or frame 32 integrally formed to include symmetrically spaced apart side legs 33 and 34. Frame 32 is preferably of a hard metal such as brass and of a relatively thin cross section. Bracket 35 is permanently secured to the end of the Bourdon tube as by welding, soldering, brazing or the like.

Installed between carriage legs 33 and 34 are a pair of longitudinally displaced rotatable shafts 39 and 40. Shaft 39 provides a hinge support for a geared sector arm 41 secured thereto as by staking at 44 while shaft 40 represents the output drive shaft supporting pointer 19. Rotation of shaft 40 for positioning pointer 19 is effected by pinion 64 secured thereto and meshing with sector gearing 47 of arm 41.

Figure 4:
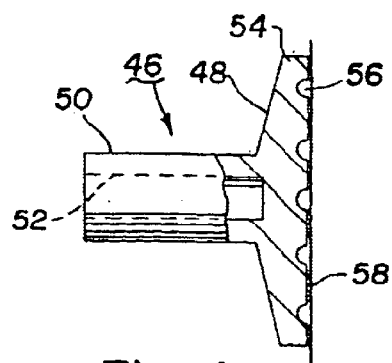
FIG. 4 is a still larger fragmentary showing of the dampener unit for the embodiment of FIGS. 2 and 3.

To effect dampening in accordance herewith in order to offset any sudden shock, pulsation or vibration forces as might otherwise be transmitted from the Bourdon tube 18 to pointer 19, there is provided in accordance with the first embodiment of the invention a dampener, designated 46, as best seen in FIGS. 3 and 4. Dampener 46 is essentially of a T-shaped hub disc configuration comprising an integral body 48 including a sleeved shank 50 having a bore 52 adapted to closely but loosely fit about extended pinion shaft 40 received therein. The integral disc portion is designated 54 and includes on its rear surface a plurality of grooves or recesses 56 adapted to receive a quantity of high viscosity dampener agent 58. The intervening dampener agent forms a cushioning layer between the back surface of disc 54 and the interior face of housing wall 25 thereat.

Bore 52 provides a relatively loose fit about shaft 40 on the order of about 0.002 inches to 0.030 inch clearance with a preferred range being on the order of about 0.006 inches–0.015 inches. The available clearance surrounding the shaft end is packed with a high viscosity dampener agent such as silicone oil having a viscosity of about between 1 million centistokes to a grease consistency number 144 per ASTM D 1403 with optimum being a consistency number of 190. Below about 1 million, the dampener agent may consist largely of silicone oil at which minimal, if any, dampening can occur. At and above viscosity consistencies of number 144, excessive dampening is incurred. In this arrangement, the dampener agent bore when packed acts as a dampener for any sudden impulsive rotation otherwise destined for the pointer shaft 40 while the back side of disc 54 essentially seats or floats against a cushion on the interior back face of the housing.

Figure 5:
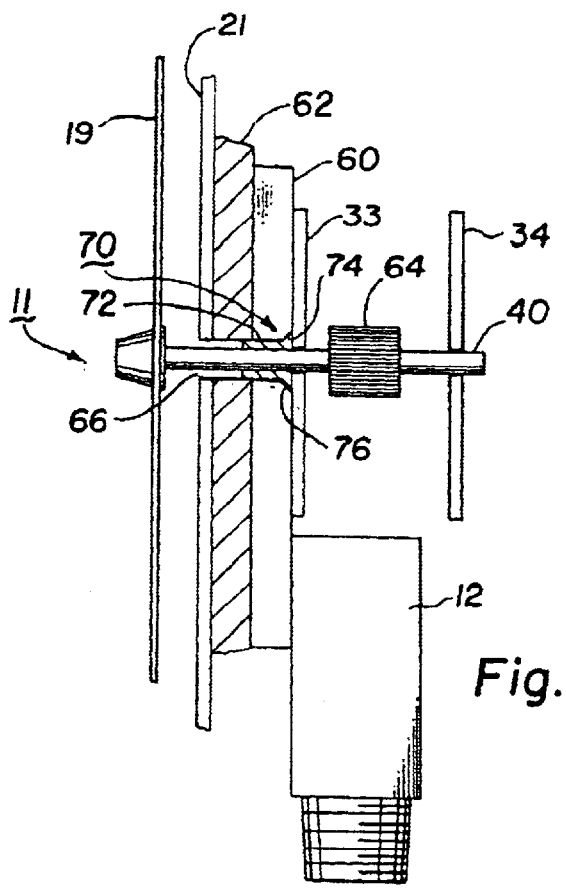
FIG. 5 is fragmentary enlarged elevation showing the dampener of the second embodiment hereof.
Figure 6:
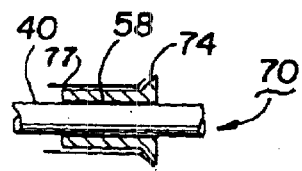
FIG. 6 is an enlarged fragmentary view of the dampener installation of FIG. 5.

In a second embodiment in accordance herewith, as best seen in FIGS. 5 and 6, the pressure gauge 11 includes similar components as above and further includes a back plate 60 and a case wall 62. Pinion shaft 40 extends through aperture 66 enabling pinion 64 on shaft 40 to drive pointer 19. Dampener 70, for this embodiment, is comprised of a tubular ferrule 72 that is flared outwardly at its rear 74 for intermitting with chamfer 76 at the entrance of back plate 60 to aperture 66. As before, the ferrule provides a loose fit with clearances as stated above while a surrounding clearance 77 is provided in back plate 60, case wall 62 and chamfer 76 of about 0.009 inches to about 0.051 inches. All surrounding and internal clearances are then packed with a dampener agent having a viscosity in the ranges stated above. The ferrule in this arrangement operates as a shear mechanism immersed in a body of dampener agent.

Figure 7:
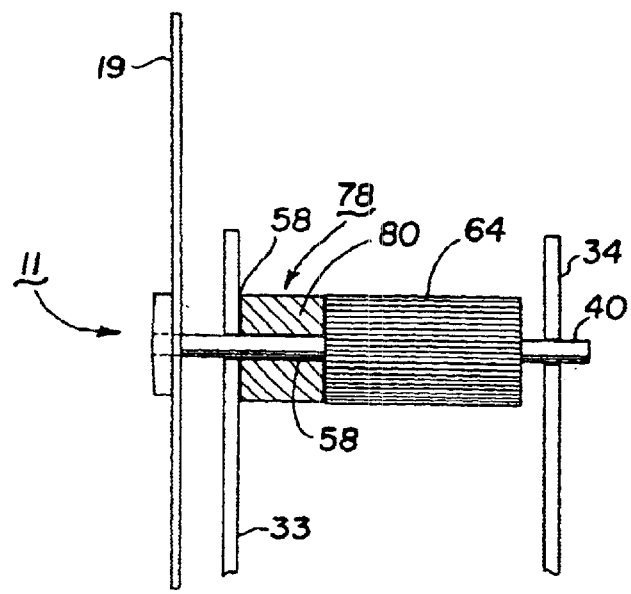
FIG. 7 is a fragmentary elevation showing the dampener of the third embodiment hereof.

For the third embodiment hereof, as best seen in FIG. 7, the dampener 78 is comprised of a hub 80 situated on pointer shaft 40 intervening between the side face of pinion 64 and the backside of side leg 33. As before, the hub provides a loose fit with the stated clearances being packed with a high viscosity dampener agent having viscosity in the ranges noted supra.

Pinion 64 and hub 80 are of substantially the same diameter. The hub arcuately displaces with the pinion placing the opposing side faces of the pinion and hub in the aforementioned shear, non-stationary, relation. Preferably, the dampener agent cushioned pinion engagement with the hub and the dampener agent cushioned hub engagement against plate 33 should be about equal. Unlike the previous embodiments, this embodiment does not require any structural modification to the gauge per se.

Figure 8:
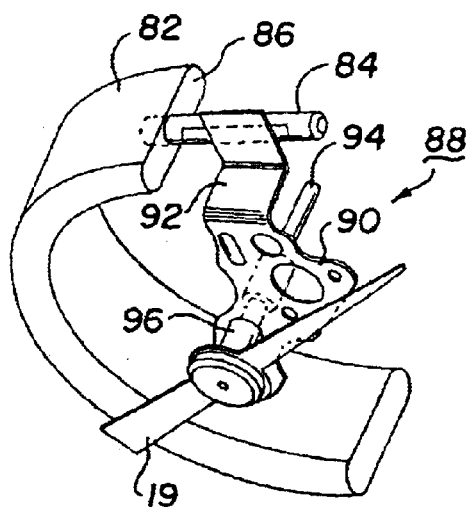
FIG. 8 is a fragmentary isometric showing of a gauge structure containing a fourth embodiment hereof.
Figure 9:
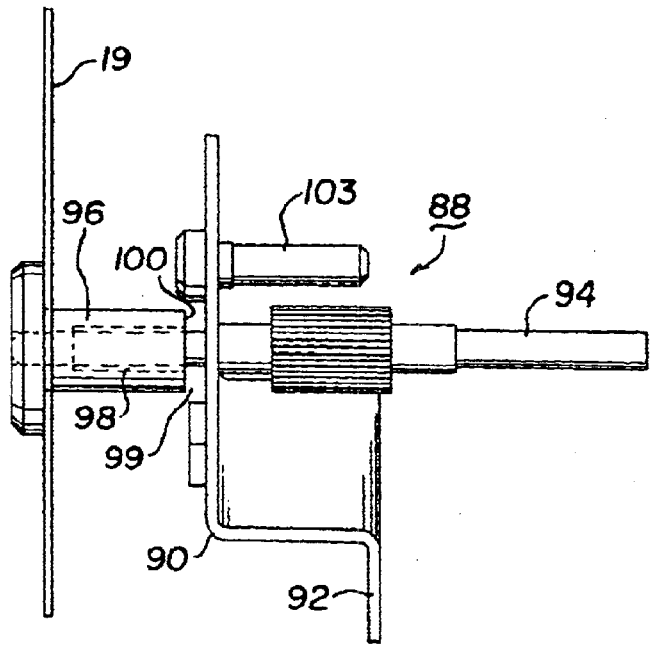
FIG. 9 is an enlarged fragmentary side elevation of the dampener installation of FIG. 8.

Referring now to FIGS. 8 and 9, there is illustrated a fourth embodiment in which a modified Bourdon tube 82 includes an elongated pin 84 extending outward of its displaceable end 86 for operating pointer 19. The movement 88 is supported on a rigid bracket plate 90 secured at its offset upper end 92 to pin 84.

Comprising movement 88 is a pinion shaft 94 supported by bracket plate 90 and which movement 88 at its distal end receives a hub 96 press fit at one end onto pinion shaft 94. The latter is back drilled at 98 to define an annular clearance thereat serving as a reservoir filled with dampener agent 58 above. Hub 96 is of a length to create a predetermined spacing 99 between end face 100 and bracket plate 90 thereat that likewise is filled with dampener agent 58. Lateral pin 103 provides an underload stop for receiver gauges in the range of 3–15 psi.

Figure 10:
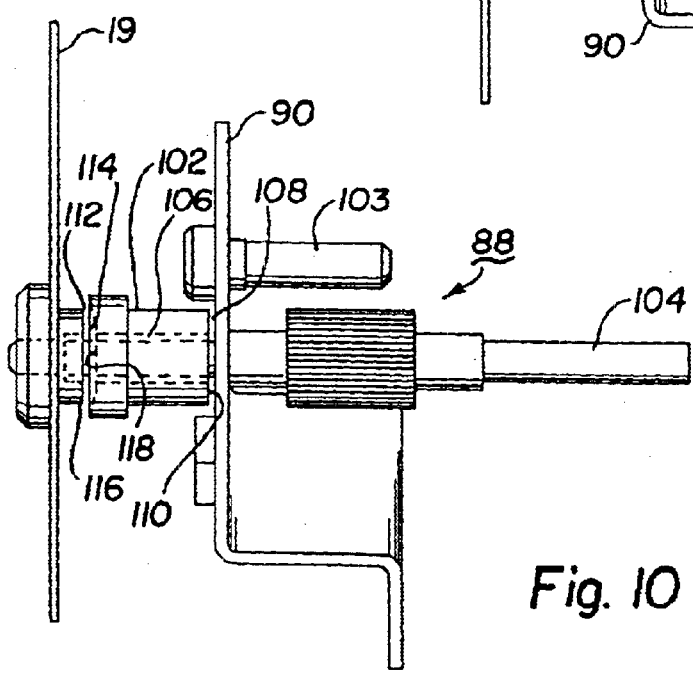
FIG. 10 is fragmentary enlarged side elevation showing the dampener of the fifth embodiment hereof.

For the fifth embodiment of FIG. 10, a floating bushing 102 surrounds pinion shaft 104 with a predetermined annular clearance 106 extending therebetween. Bushing 102 is sized longitudinally to define a first axial clearance 108 between end face 110 opposite bracket plate 90 and a second axial clearance 112 between end 114 and pointer hub 116. Bushing surface 118 preferably includes a concave recess that when filled with dampener agent 58 affords optimum dampening characteristics. Dampening agent 58 is also provided in clearance 106 and optimally in clearance 108.

In the sixth embodiment of FIGS. 11–15, the structure is similar to the fifth embodiment of FIG. 10, but with stepped bushing 120 surrounded over a partial length by annular housing 122 portion of body 13. The latter is secured to sheet metal bracket plate 90 in a press fit relation with a plurality of lugs 124 received in body apertures 126. Clearances as above are defined between bushing 120 and housing 122, and axially between housing 122 and plate 90. Dampener agent is typically applied on the interior of bushing 120 before placement within housing 122, before being located on pinion shaft 104 and on the other clearances mentioned as required.

Figure 16:
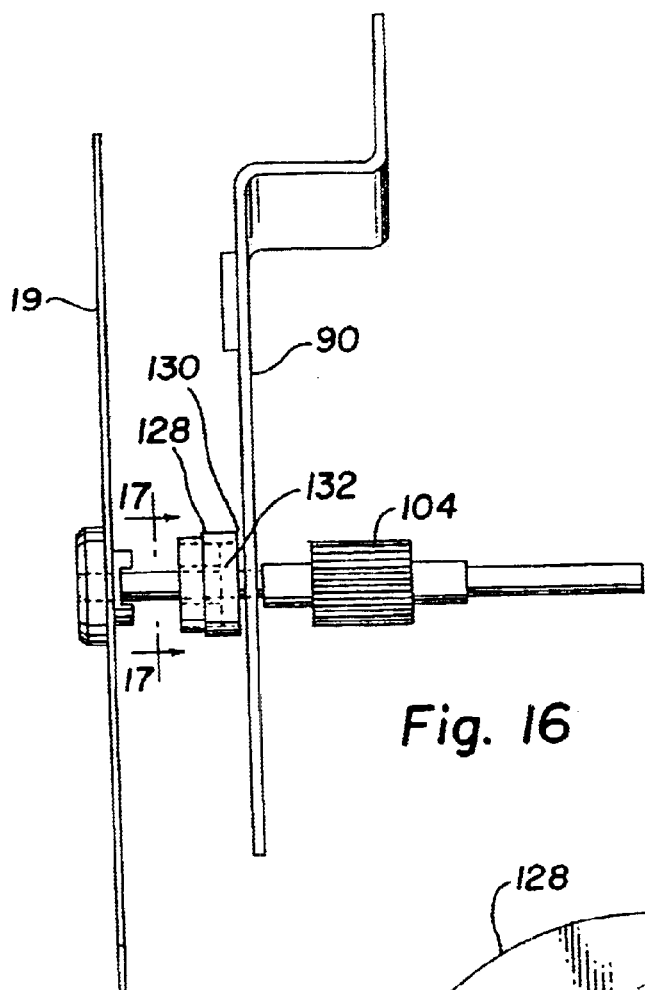
FIG. 16 is fragmentary enlarged side elevation showing the dampener of the seventh embodiment hereof.
Figure 17:
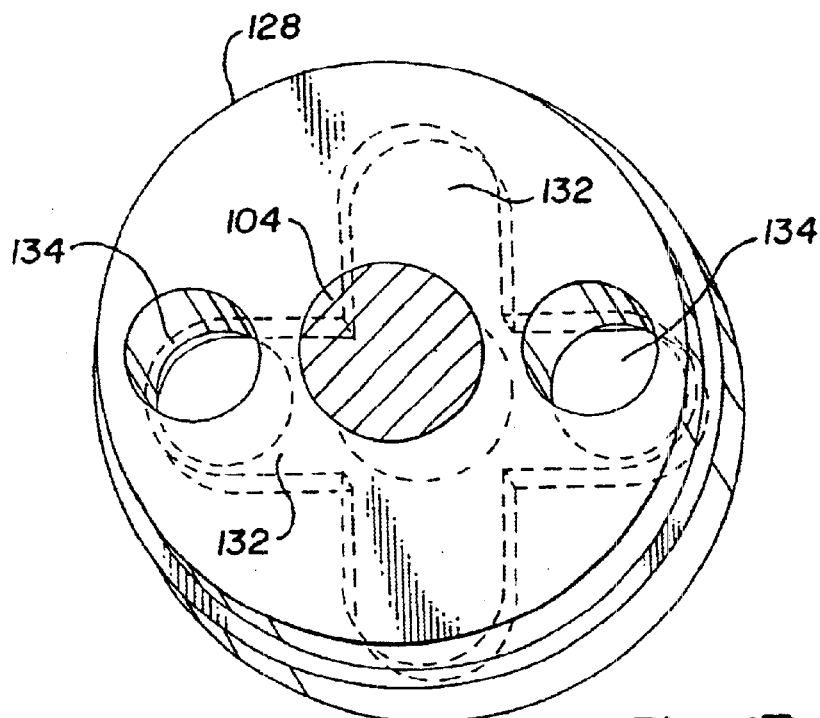
FIG. 17 is a sectional isometric view as seen substantially from the position 17—17 of FIG. 16.

The seventh embodiment will now be described with reference to FIGS. 16 and 17. For this embodiment, bushing 128 is force fit onto pinion 104 and positioned axially such that the clearance 130 between it and retainer plate 90 is of a predetermined value (approximately 0.040 inch) to yield the optimum dampening characteristic when dampening agent 58 is present between these surfaces. Bushing 128 preferably includes a cross-shaped cut 132 which functions as the negative inverse of a conventional paddle in augmenting the dampening characteristics. Bushing 128 also features through apertures 134 that intersect cut 132 and provide a convenient fill port for the dampening agent to be applied.

The eighth embodiment, as best seen in FIGS. 18–22, is similar to the fourth embodiment shown in FIG. 9 with the addition of body 138 similar in form and attachment to the housing 122 in the sixth embodiment of FIG. 11 above. The central hub portion 120 of housing 138 is relatively short in height—i.e., is of a length just sufficient to create a moat-like reservoir 136 to preclude the possibility of dampening agent migration with time, temperature and certain environmental conditions such as shock and vibration. Lugs 124 are integral with body 138 press fit into movement plate 90 as described supra.

Figure 23:
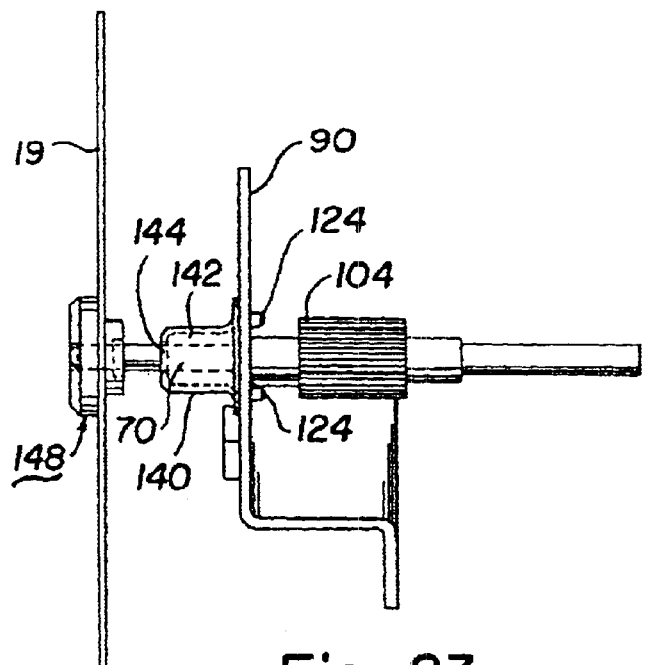
FIG. 23 is a fragmentary enlarged side elevation showing the dampener of the ninth embodiment hereof.

The ninth embodiment of FIG. 23 includes an open ended cup 140 sized to afford a predetermined annular clearance 142 between itself and pinion shaft 104. The internal diameter of cup 140 is also preselected to yield a void clearance volume 142 that when filled with the dampening agent yields optimum dampening characteristics of the pointer/hub assembly under externally applied vibratory conditions. Integral with cup 140 are a pair of lugs 124 that cooperate with apertures in bracket plate 90 to create an interference fit attachment. Aperture 144 at the distal end of cup 144 is sized to create a close clearance fit with pinion shaft 104, on the order of 0.002 inch per side to minimize undesirable migration of the dampening agent beyond the cup interior. This construction has the advantage that due to the close fit at aperture 144 and the cup flange being integral with bracket plate 90 throughout its entire circumference, risk of agent migration is minimized.

Figure 24:
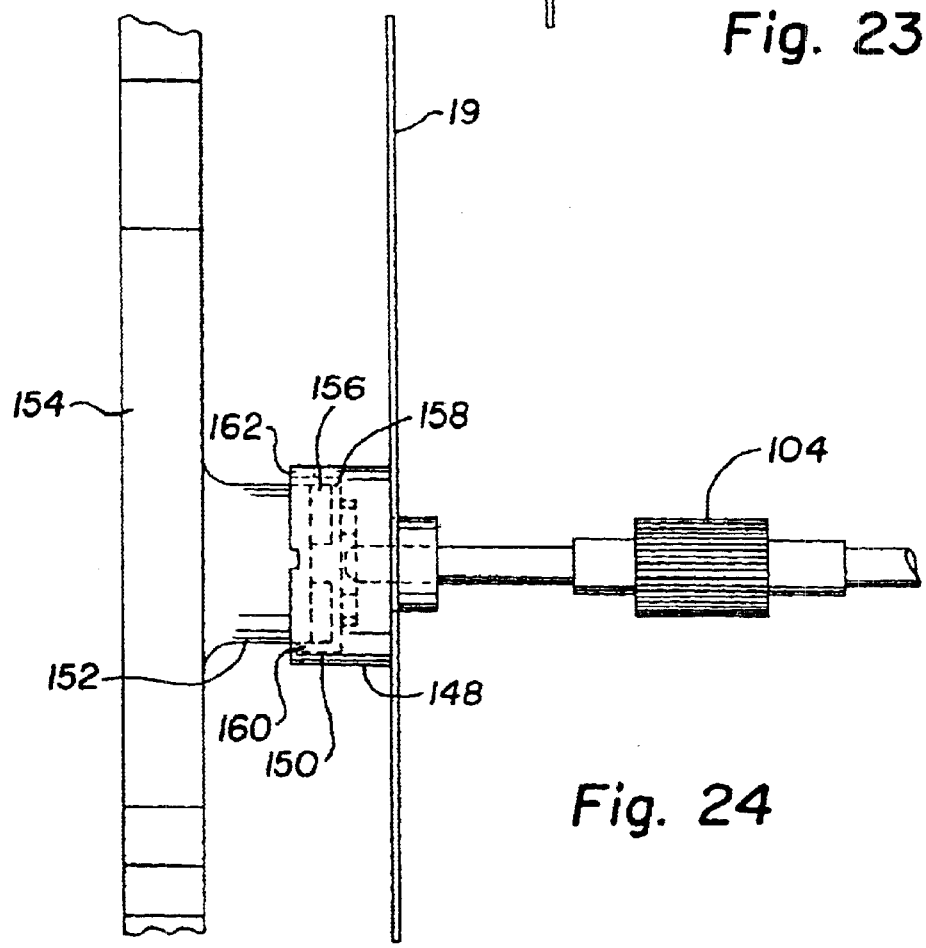
FIG. 24 is a fragmentary side elevation showing the dampener of the tenth embodiment hereof

For the tenth embodiment of FIG. 24, pointer hub 148 is configured to have a front cylindrical recess 150 for receiving cylindrical post 152 that may be part of or suitably secured to viewing crystal 154. Post 152 may optionally include cross shaped boss 156 that functions as a paddle when void 158 and void 160 are filled with the dampening agent 58. The axial clearance between post 152 and hub 148 is again selected to provide optimal dampening of the pointer under vibratory conditions. Boss 156 augments the dampening that the shear presence of the dampener agent 58 provides. Radial clearance 160 between hub 148 and post 152 is selected to be either close (approximately 0.005 inch per side) in the case of a rotating only pinion shaft 104 or greater (approximately 0.050 inch per side) in the case of a rotating and translating pinion shaft 40 as disclosed, for example, in FIG. 1. The presence of recess 150 in hub 148 does not preclude the ability to field adjust or zero pointer 19 by virtue of optional slot 162.

A significant feature of this embodiment is that the gauge can be constructed to completion including calibration and final assembly with effectual pointer staking without committing to whether or not the gauge will be utilized with or without dampening. That decision can be made just prior to assembling the ring and crystal. Likewise it is most readily adapted to retrofit gauges in the field or at distributor locations with regard to dampening.

By the above description there is disclosed novel and simple constructions for dampening the adverse effects of shock and vibration that might otherwise cause fluctuations in the positioning of pointer 19. By relatively simple and expedient constructions of the various embodiments utilizing the simplest of components, an otherwise adverse problem encountered in the operation of such pressure gauges is readily and inexpensively overcome. It is especially worthy to note that the embodiment of FIGS. 9 and 24 hereof are unique in that neither employs an extra part beyond what is necessary to construct the gauge, thereby lending versatility in the provision of the pointer dampening characteristic.

Since many changes could be made in the above construction and many apparently widely different embodiments of this invention could be made without departing from the scope thereof, it is intended that all matter contained in the drawings and specification shall be interpreted as illustrative and not in a limiting sense.

We claim:

1. A pressure gauge including a fluid inlet at which to receive fluid of which the value of pressure is to be monitored, a pressure sensitive Bourdon tube responsive to changes in pressure values of fluid received in said inlet and a pointer indicator supported on an arcuately displaceable pointer shaft and operative by said Bourdon tube for providing indicia of the value of pressure being received, the improvement comprising a dampener for suppressing undesirable vibration force in the received fluid from being transmitted to said pointer indicator, said dampener comprising:

a cylindrical hub having a first end secured to the pointer shaft, a second end and a tubular bore in which to internally receive a portion of said pointer shaft, said tubular bore defining a first internal diameter at the first end at which said hub is secured to said shaft and a second internal diameter larger than said first diameter and defining an annular clearance between said shaft and the second internal diameter of said hub, and the second end juxtaposed a substantially fixed surface and defining an axial clearance therebetween; and a packing of dampener agent of predetermined viscosity positioned in the annular clearance between the second internal diameter of said hub tubular bore and said received shaft portion and in the axial clearance between said hub second end and said substantially fixed surface whereby lubricant cushioning is effected.

2. A pressure gauge in accordance with claim 1 in which said clearances containing said packing of dampener agent are of controlled predetermined dimension.

3. A pressure gauge in accordance with claim 2 in which said annular clearance between the hub tubular bore and received pointer shaft is on the order of 0.002 inches–0.030 inches.

4. A pressure gauge including a fluid inlet at which to receive fluid of which the value of pressure is to be monitored, a pressure sensitive Bourdon tube responsive to changes in pressure values of fluid received at said inlet and a pointer indicator supported on an arcuately displaceable pointer shaft and operative by said Bourdon tube for providing indicia of the value of pressure being received, the improvement comprising a dampener for suppressing undesirable vibration force in the received fluid from being transmitted to said pointer indicator, said dampener comprising:

a cylindrical bushing having first and second ends and a tubular bore in which to internally receive a portion of said pointer shaft with a defined annular clearance therebetween, said bore being in floating relation to said shaft while said first end includes and annular recess adjacent said pointer to define a first axial clearance and said second end is positioned opposite a juxtaposed substantially fixed surface to define a second axial clearance; and a packing of dampener agent of predetermined viscosity contained within each of said clearances for effecting a cushioning layer of dampener agent thereat.

5. A pressure gauge in accordance with claim 4 comprising a hub supported on said pointer shaft and secured between said pointer and said first end of said bushing, and wherein said axial recess is defined between said first end of said bushing and the hub.

6. A pressure gauge in accordance with claim 5 in which said packing dampener agent is contained within said clearances of controlled predetermined dimension.

7. A pressure gauge in accordance with claim 6 in which the clearance between the bushing bore and received pointer shaft in on the order of 0.002–0.030 inches.

8. A pressure gauge including a fluid inlet at which to receive fluid of which the value of pressure is to be monitored, a pressure sensitive Bourdon tube responsive to changes in pressure values of fluid received at said inlet and a pointer indicator supported on an arcuately displaceable pointer shaft and operative by said Bourbon tube for providing indicia of the value of pressure being received, the improvement comprising a dampener for suppressing undesirable vibration force in the received fluid from being transmitted to said pointer indicator, said dampener comprising:

a stepped bushing having first and second ends with one of said ends being supported in a secured relation and the other of said ends being supported in a spaced apart relation and including a tubular bore internally receiving a portion of said pointer shaft, said pointer shaft positioned extending therethrough so as to define both axial and radial clearances thereabout; and a packing of dampener agent of predetermined viscosity positioned intervening within said clearances for effecting a cushioning layer of dampener agent therebetween.

9. A pressure gauge including a fluid inlet at which to receive fluid of which the value of pressure is to be monitored, a pressure sensitive Bourdon tube responsive to changes in pressure values of fluid received at said inlet and a pointer indicator supported on an arcuately displaceable pointer shaft and operative by said Bourdon tube for providing indicia of the value of fluid pressure being received, the improvement comprising a dampener for suppressing undesirable vibration force in the received fluid from being transmitted to said pointer indicator, said dampener comprising:

a bushing having first and second ends and a stepped tubular bore having a first diameter through which to internally receive a portion of said pointer shaft positioned extending therethrough so as to define an annular clearance therebetween and a second diameter smaller than said first diameter for effecting a force fit with said pointer shaft so as to define predetermined axial clearances between each said ends and respective juxtaposed substantial fixed surfaces; and a packing of dampener agent of predetermined viscosity contained within said clearances for effecting a cushioning layer of dampener agent therebetween.

10. A pressure gauge in accordance with claim 9 wherein said substantially fixed surface juxtaposed to said second bushing end comprises a support plate for supporting said pointer shaft.

11. A pressure gauge in accordance with claim 9 comprising at least one axial thru-bore extending through said first bushing end parallel to said tubular bore for providing dampener agent to said clearances.

12. A pressure gauge in accordance with claim 9 wherein the bushing second end comprises an end face including a cross shaped cut about the end face to afford a paddle action to dampener agent in the clearance thereat.

13. A pressure gauge in accordance with claim 1 comprising a housing extending about the second end of said hub and toward said opposite juxtaposed substantially fixed surface for containment of said dampener agent.

14. A pressure gauge including a fluid inlet at which to receive fluid of which the value of pressure is to be monitored, a pressure sensitive Bourdon tube responsive to changes in pressure values of fluid received at said inlet and a pointer indicator supported on an arcuately displaceable pointer shaft and operative by said Bourdon tube for providing indicia of the value of pressure being received, the improvement comprising a dampener for suppressing undesirable vibration force in the received fluid from being transmitted to said pointer indicator, said dampener comprising:
- a tubular open-ended cup internally passing a portion of said pointer shaft and positioned with a first end of said cup secured to a juxtaposed substantially fixed surface thereat at a second end closely surrounding said shaft, said cup being of an internal diameter to define a predetermined clearance with respect to the outside diameter of said received shaft portion therein; and
- a packing of dampener agent of predetermined viscosity positioned intervening in the clearance between said cup and said shaft portion therein for effecting a cushioning layer of dampener agent therebetween.

15. A pressure gauge including a fluid inlet at which to receive fluid of which the value of pressure is to be monitored, a pressure sensitive Bourdon tube responsive to changes in pressure values of fluid received at said inlet, a pointer indicator supported on an arcuately displaceable pointer shaft and operative by said Bourdon tube for providing indicia of the value of pressure being received, a housing and a crystal cooperatively assembled to said housing for enclosing the operative components of the gauge, the improvement comprising a dampener for suppressing undesirable vibration force in the received fluid from being transmitted to said pointer indicator, said dampener comprising:
- a cylindrical post laterally extending from the interior face of said crystal to a distal end inward of said housing;
- a cylindrical hub through which to receive said pointer shaft for displacement therewith, said hub having a front face tubular recess at least partially encircling said post so as to define an annular clearance therebetween and an axial clearance between the distal end of said post and the recess of said hub; and
- a packing of dampener agent of predetermined viscosity positioned intervening within said clearances for effecting a cushioning layer of dampener agent therebetween.

16. A pressure gauge comprising:
- a fluid inlet at which to receive fluid of which the value of pressure is to be monitored,
- a pressure sensitive Bourdon tube responsive to changes in pressure values of fluid received at said inlet,
- a pointer indicator supported on a pointer shaft and operative by said Bourdon tube for providing indicia of the value of pressure being received,
- a housing and a crystal cooperatively assembled to said housing for enclosing the operative components of the gauge, and
- dampening means for suppressing undesirable vibration force in the received fluid from being transmitted to the pointer indicator, wherein the dampening means comprises:
  - a dampener positioned in close proximity to a substantially fixed surface to define a clearance between the dampener and the fixed surface, wherein the dampener is secured to the pointer shaft, and
  - a dampening agent positioned in the clearance.

17. A pressure gauge comprising:
- a fluid inlet at which to receive fluid of which the value of pressure is to be monitored,
- a pressure sensitive Bourdon tube responsive to changes in pressure values of fluid received at said inlet,
- a pointer indicator supported on a pointer shaft and operative by said Bourdon tube for providing indicia of the value of pressure being received,
- a housing and a crystal cooperatively assembled to said housing for enclosing the operative components of the gauge, and
- dampening means for suppressing undesirable vibration force in the received fluid from being transmitted to the pointer indicator, wherein the dampening means comprises:
  - a dampener positioned along the pointer shaft to define a clearance between the dampener and the pointer shaft, and
  - a dampening agent positioned in the clearance.

18. The pressure gauge of claim 17, wherein the dampener is secured to the pointer shaft.

19. The pressure gauge of claim 17, wherein the dampener is positioned in close proximity to a substantially fixed surface to define a surface clearance between the fixed surface and the dampener, and wherein the dampening agent is also positioned in the surface clearance.

* * * * *

UNITED STATES PATENT AND TRADEMARK OFFICE
CERTIFICATE OF CORRECTION

PATENT NO.    : 6,651,507 B1  
DATED         : November 25, 2003  
INVENTOR(S)   : John C. Hamma et al.

Page 1 of 1

It is certified that error appears in the above-identified patent and that said Letters Patent is hereby corrected as shown below:

<u>Column 2,</u>  
Line 56, after "agent." begin new paragraph and insert -- By virtue of a relatively simple construction, satisfactory dampening in a pressure gauge can --.

<u>Column 5,</u>  
Line 51, after "body" replace "13" with -- 138 --.

Signed and Sealed this

Twenty-seventh Day of April, 2004

JON W. DUDAS  
*Acting Director of the United States Patent and Trademark Office*